(12) United States Patent
Leickel et al.

(10) Patent No.: US 6,631,264 B1
(45) Date of Patent: Oct. 7, 2003

(54) RADIO TELEPHONES AND METHODS OF OPERATION

(75) Inventors: Torsten Leickel, Herne (DE); Nguyen Quan Tat, Yateley (GB)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/335,174

(22) Filed: Jun. 17, 1999

(30) Foreign Application Priority Data

Jun. 26, 1998 (GB) ............................................. 9813909

(51) Int. Cl.⁷ ................................................ H04Q 7/20
(52) U.S. Cl. ...................... 455/437; 455/450; 455/509; 455/434
(58) Field of Search ................................ 455/434, 437, 455/435, 436, 464, 67.3, 67.4, 62, 63, 556–557, 226.2, 226.3, 438, 439, 450, 509

(56) References Cited

U.S. PATENT DOCUMENTS

| | | | | |
|---|---|---|---|---|
| 5,255,307 A | * | 10/1993 | Mizikovsky | 455/552 |
| 5,657,375 A | * | 8/1997 | Connoly et al. | 455/436 |
| 5,664,005 A | * | 9/1997 | Emery et al. | 455/422 |
| 5,722,078 A | * | 2/1998 | Przelomiec et al. | 455/452 |
| 5,754,956 A | * | 5/1998 | Abreu et al. | 455/434 |
| 5,778,316 A | * | 7/1998 | Persson et al. | 455/434 |
| 5,903,839 A | * | 5/1999 | Mattila | 455/434 |
| 5,966,670 A | * | 10/1999 | Keskitalo et al. | 455/562 |
| 5,974,320 A | * | 10/1999 | Ward et al. | 455/437 |
| 6,026,300 A | * | 2/2000 | Hicks | 455/434 |
| 6,047,175 A | * | 4/2000 | Trompower | 455/422 |
| 6,061,559 A | * | 5/2000 | Eriksson et al. | 455/414 |
| 6,104,926 A | * | 8/2000 | Hogg et al. | 455/431 |
| 6,108,541 A | * | 8/2000 | Yazaki et al. | 455/434 |
| 6,119,002 A | * | 9/2000 | Alanara | 455/434 |
| 6,198,926 B1 | * | 3/2001 | Lorieau | 455/434 |
| 6,278,877 B1 | * | 8/2001 | Bredeveld et al. | 455/434 |
| 6,285,881 B1 | * | 9/2001 | Huang | 455/434 |
| 6,480,719 B1 | * | 11/2002 | Schloemer et al. | 455/450 |

FOREIGN PATENT DOCUMENTS

| | | |
|---|---|---|
| GB | 2250892 A | 6/1992 |
| GB | 2275848 A | 9/1994 |
| GB | 2295750 A | 6/1996 |

* cited by examiner

*Primary Examiner*—Lee Nguyen
*Assistant Examiner*—Charles Craver
(74) *Attorney, Agent, or Firm*—Antonelli, Terry, Stout & Kraus, LLP

(57) ABSTRACT

An apparatus and method for reducing battery consumption in a radio telephone by scanning for additional local base stations when a currently monitored signal from a local base station is deteriorating.

29 Claims, 4 Drawing Sheets

RADIO TELEPHONES AND METHODS OF OPERATION

BACKGROUND OF THE INVENTION

The invention relates to a radio handset for communication in a radio system allowing communication with a selected base station on a selected channel. In particular the invention relates to a telephone that derives information identifying a local base station by monitoring a signal transmitted thereby.

A radio telephone system typically includes a number of base stations and many radio telephones or handsets. To operate on the system a handset must be able to communicate via a base station on a particular communication channel.

In some systems it is the handset that carries the channel selection algorithms. In such systems it is necessary for the handset to find a local base station and select a free channel when required. A channel carrying information e.g. a traffic or bearer channel, can be monitored to identify a base station in the vicinity.

To enable a channel suitable for traffic to be found when required, a handset typically scans the channels available in the system periodically to have an up-to-date picture of which channels are bearer channels and which are free. The more frequently the channels are scanned, the more up-to-date the system picture held by the handset and the faster on average the handset will be able to select a suitable channel for two-way communication if required. The frequency of scanning has a considerable impact on power consumption and for a battery operated device, battery life.

In a system such as DECT (Digital European Cordless Telecommunications), bearer and free channels are identified by monitoring the Radio Signal Strength Indicator (RSSI) of each channel at regular time intervals. The measured signal strengths are stored in a periodically updated channel list. A high RSSI indicates a bearer channel. Using the RSSI information gathered periodically the base station providing the strongest connection can be identified by determining which base stations are transmitting the strongest signals in the locality. A quiet channel can then be found on a local base station by selecting a channel with a low RSSI. Under the DECT protocol this will typically be the quietest channel on a base station transmitting the strongest signal. The handset must monitor the strongest RSSI signal in order to determine the identity of the base station that is transmitting on that channel.

In order to ensure good performance, the handset needs, in practice to scan for a base station once every 10–20 seconds. This has a considerable impact on power consumption.

SUMMARY OF THE INVENTION

In accordance with the invention there is provided a radio telephone for communication in a radio system allowing communication on a selected channel of a selected base station, the telephone being operable to derive information on the system by monitoring a signal transmitted thereby, the telephone comprising processing means operative to scan respective system channels and identify a local base station in response to an indication that a parameter of a monitored signal meets a predetermined criterion and a method of operating a radio telephone to identify local base stations in a system allowing communication on a selected channel of a selected base station, information on the system being derived by the telephone by monitoring a signal transmitted by that system, comprising scanning respective system channels and identifying a local base station responsive to an indication that a parameter of a currently monitored signal meets a predetermined criterion.

In prior art handsets, each time a new channel is required, the most up-to-date scanned information is used to select a channel on the strongest base station. The handset will occasionally scan for a base station with a stronger signal strength. If a stronger base station is found, then the handset will monitor this base station instead and select a channel on that base station (ETSI standard 300 175; 11.3.3., second version 1995). This is a heavy drain on the limited battery power of the handset. By making a scan for a new base station responsive to a parameter of the monitored signal, periodic scans for identifying the strongest base station in the locality can be avoided. This has a beneficial impact on battery life.

If the parameters of the signal transmitted by a particular base station indicate that it is likely to be able to support a traffic channel of reasonable quality, there is no need for the handset to identify another base station. Under these circumstances, the additional scanning time and power consumption required to identify the best local base station rather than the currently monitored adequate base station provides at best only a limited improvement in signal quality.

One suitable measure of the likely quality of a traffic channel on a given base station is the strength of a signal transmitted by that base station and received by handset. A suitable and convenient measure of the strength of a received signal is its RSSI, although other measures such as bit error rate could be utilised. The respective system channels may be scanned to identify a strong signal and transmitting local base station if the RSSI of the monitored signals fall below a predetermined level.

If a traffic channel is already in use by the radio telephone, the trigger RSSI level is preferably set to provide for the possibility of the radio telephone making attempts at locating a suitable channel on successive base stations before the quality of the existing traffic channel deteriorates to an extent that significantly effects data transfer.

Similar considerations ideally apply for initial call set up. The critical concern under these circumstances is finding a suitable traffic channel before the monitored signal is lost. As call set up will be triggered by events other than deterioration of the monitored signal, the RSSI level of the monitored signal needs to be sufficient to indicate that the base station will provide an acceptable traffic channel. The issue of losing data is not so relevant.

In one embodiment of the invention, the radio telephone has the additional capability of assessing the environment of the system it is monitoring and suspending all scanning for additional base stations when a particular environment is detected. This can be particularly advantageous when the system being monitored is a residential, or other system that has only a single base station. Under these conditions the search for additional base stations would only consume power with little benefit.

BRIEF DESCRIPTION OF THE DRAWINGS

The invention will be described in more detail with reference to the accompanying drawings of which.

DETAILED DESCRIPTION

Figure 1:
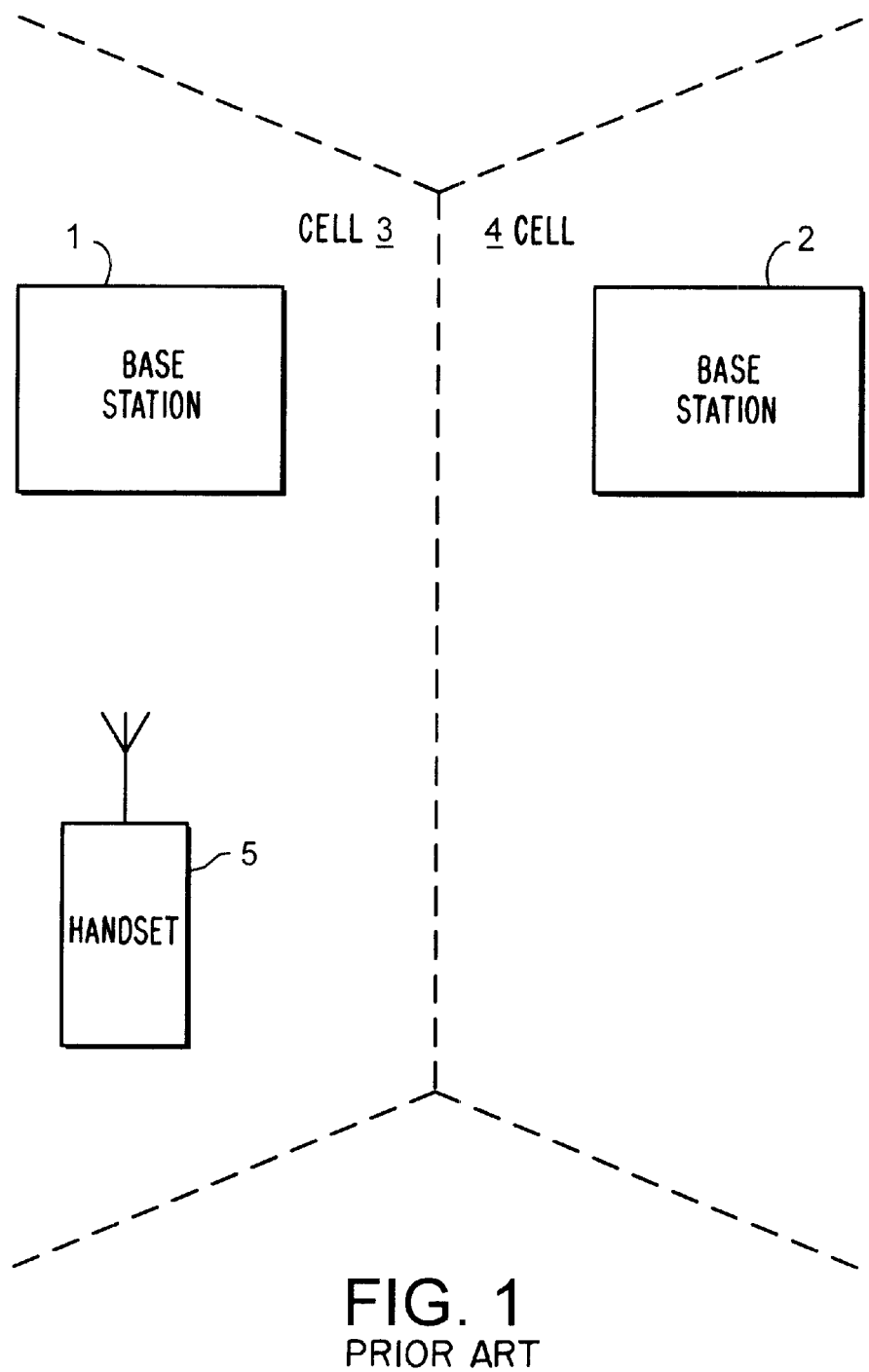
FIG. 1 is a schematic representation of a DECT system.

In the described example shown in the drawings, the radio telephone system conforms to the DECT (Digital European Cordless Telecommunications) standard and uses ten carrier frequencies, separated by 1.728 MHz, within a frequency band from 1880 MHz to 1900 MHz. This system divides time into TDMA frames, with each frame having a time duration of 10 ms. Each frame is divided into 24 time slots, numbered from 0 to 23. Each frame is divided into two halves, the first half (slots 0 to 11) being reserved for the transmission of the base station and the second half (slots 12 to 23) being reserved for the transmission of the handset. A handset communicates on a channel which in this particular case is a combination of time slot and carrier frequency.

A DECT system as illustrated in FIG. 1 typically includes one fixed part and several radio fixed parts (RFPs) or base stations 1, 2 supporting respective cells 3, 4. Many portable parts of handsets 5 can use each cell. Each fixed part is physically connected to a standard wireline telephone system, each radio fixed part 1, 2 of a common system is physically connected to the fixed part.

Figure 2:
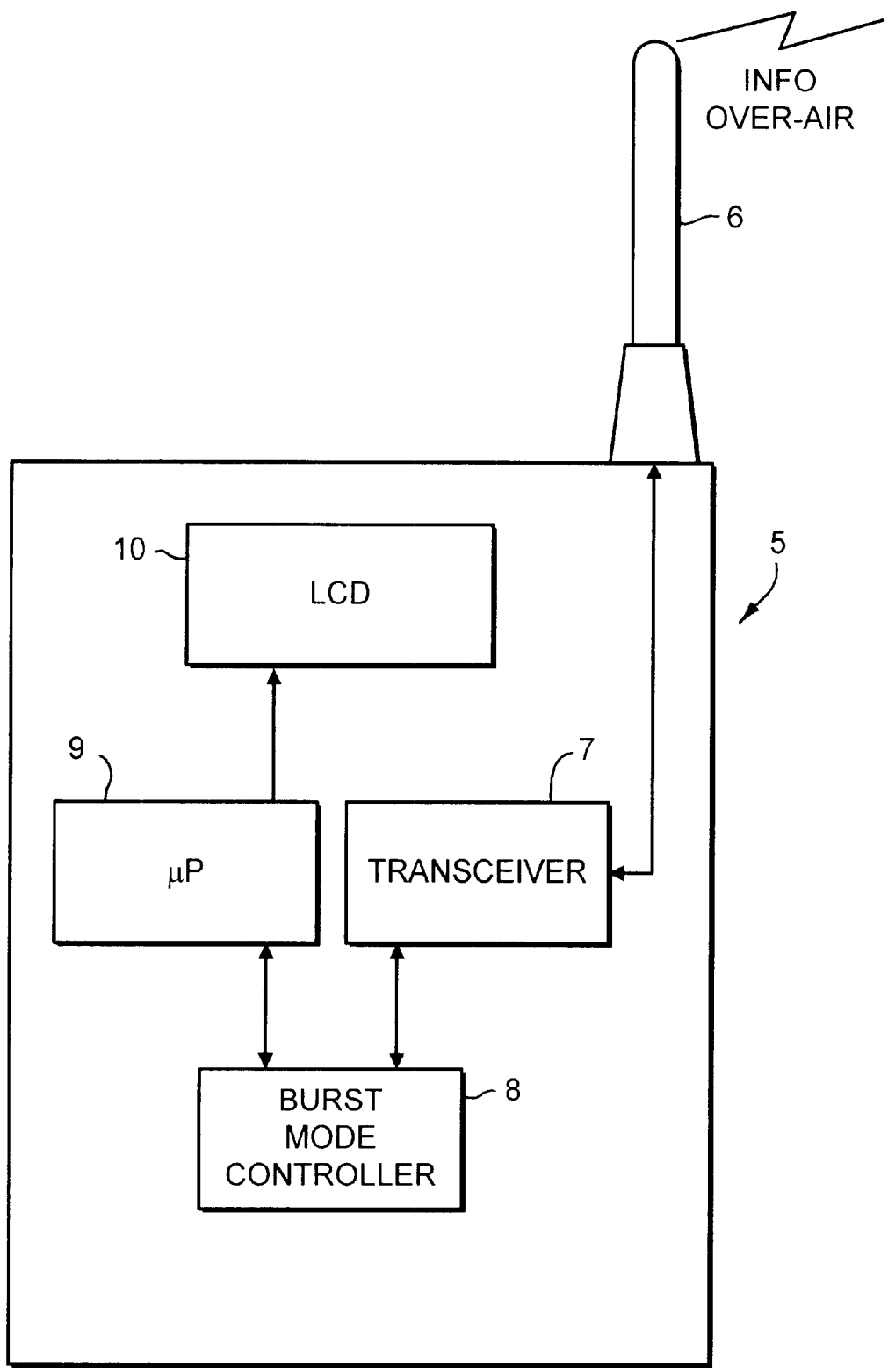
FIG. 2 is a schematic representation of a DECT handset.

Each handset 5 as illustrated in FIG. 2 has an antenna 6, a transceiver 7, a burst mode controller 8 and processing means 9 programmed with algorithms controlling communication with a base station over a communication channel. Information is displayed on a Liquid Crystal Display (LCD) 10. (FIG. 2).

Figure 3:
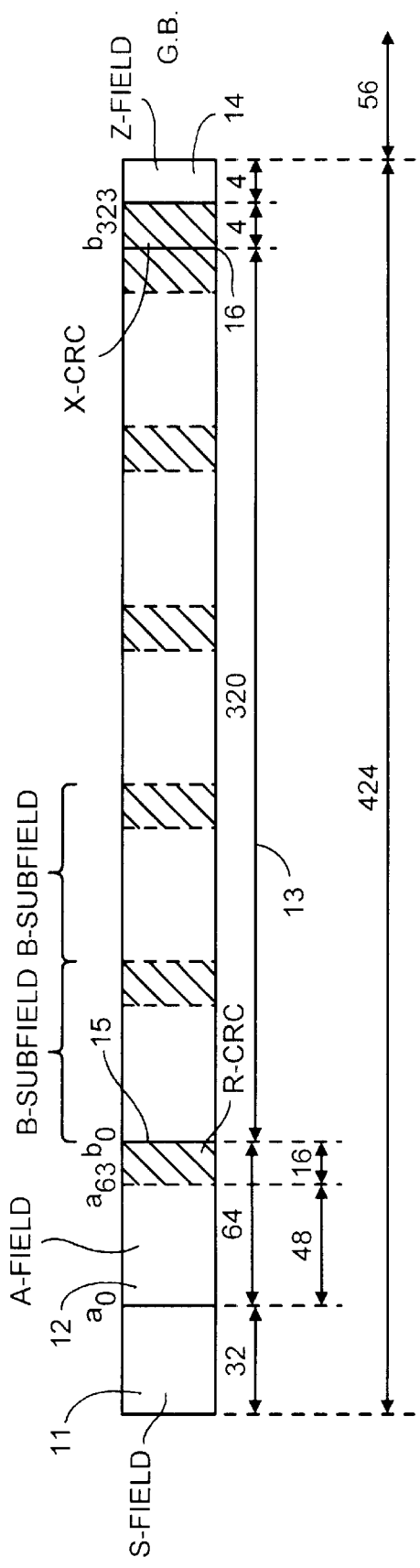
FIG. 3 is a schematic representation of the signal structure of a DECT signal package.

Transmission in one of the time slots of a frame is accomplished by sending a signal burst. Each signal burst is divided into four fields and its structure is illustrated in FIG. 3. The S-field 11 used for synchronisation, and the A-field 12, used to send signalling information in accordance with the DECT protocol are both used when locking on i.e. finding a channel for receiving system information. The B-field 13 is used for sending speech or data to a system user and the Z-field 14 is provided specifically for sliding error detection. In addition to the Z-field, the A and B fields have their own error detection subfields known as Cyclic Redundancy Checks (CRCs) R-CRC 15 and X-CRC 16 respectively. The A-field is 64 bits long with the final 16 bits, the R-CRC 15, providing an error check on the preceding 48 bits. The B-field is 320 bits. The 4 bit X-CRC 16 provides an error check on the B-field. The Z-field 14 is a repetition of the X-CRC 16.

A handset can be in two states with respect to a system, 'idle lock' ie monitoring the system with no call in progress, or 'active lock'. The handset is in active lock if a traffic channel has been allocated. The handset will only be in active lock when it is in two-way communication with the system. This may be for a call to be made or received or for the transfer of information to the system. When in active lock a change in traffic channel may be required to maintain call quality. This is termed "handover". Handover can either be to a different channel at the same RFP (intracell) or to a different channel at a different RFP (intercell). Between calls or specific information transfers with the system the handset will return to idle lock when information is only being read from the system.

Figure 4:
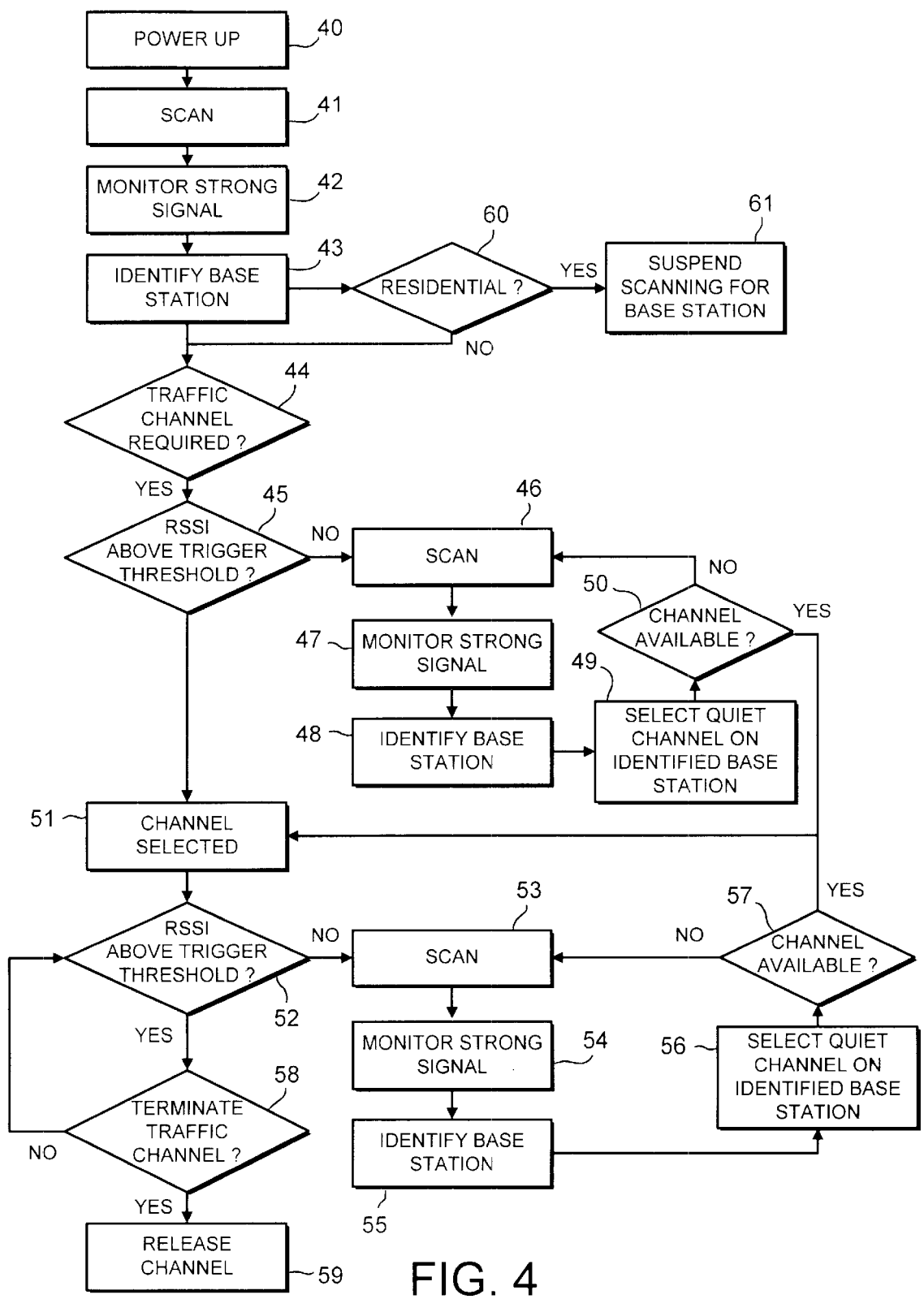
FIG. 4 is a flow chart illustrating operation of a DECT handset of an embodiment of the invention.

As illustrated in FIG. 4 on first contacting the system either because the handset has just powered up 40 or has entered the sphere of influence of the system anew, the handset locks on to the system and remains in idle lock receiving system information until a traffic or two-way channel is required. To find a suitable signal to 'listen' to system information, a handset monitoring system scans the available channels 41 for a strong signal. When a strong signal is located the handset monitors the transmitted signal 42 to receive certain system information that is being broadcast. This will include the Radio Fixed Part Identity (RFPI) of the RFP broadcasting the signal. The handset needs this information in order to identify a base station for requesting a channel for communication 43.

In order to select a traffic channel either for call set up if there is no existing call 44 or handover if there is a call in progress on a deteriorating channel, it is necessary to know which channels are not currently in use. In the prior art, the handset would scan the channels to determine the RSSI of each once every 10 to 20 s to have an up-to-date picture of available channels. In this way the information on channels is no more than 20 s out of date. Repeated scanning of this kind is significant in terms of battery consumption. To have an up-to-date picture of available channels in accordance with this embodiment of the invention it is only necessary to scan the system channels just before a traffic channel is to be selected. For this reason, in this embodiment of the present invention there is no periodic scanning of system channels, instead the system channels are scanned just prior to selection of a traffic channel.

Provided the signal being monitored by a handset in idle lock meets predetermined criteria 45, it is reasonable to assume that a channel on that base station will be suitable as a traffic channel for the handset i.e. that the base station is sufficiently close to the handset to provide a traffic channel of acceptable quality. In this particular example, the predetermined requirements are that the monitored signal is above a trigger RSSI 45.

The DECT standard ETS 300 175-3 11.4 "Physical channel selection" describes the criteria how the channels have to be measured and selected based on the measurement results. The lowest boundary should be −93 dBm. Channels with a measured RSSI of less than this lowest boundary are considered as quiet channels. The upper limit maybe a variable which depends on the interference environment. Typically the upper limit is chosen with −33 dBm. This range can be divided into ten levels each covering 6 dB. The levels are indicated by a number termed a bin value between 0 and 10, 10 indicating the highest signal strength and 0 the lowest signal strength.

Experiment has shown that it is not safe to wait until the lowest RSSI boundary (−93 dBm) is reached for channel reselection, because it is likely that the signal will be lost completely within a short time span at this level. Preferably a signal strength in the middle between the highest and lowest limit should be chosen (eg. −63 dBm, bin value 5) for the RSSI limit to ensure good connection between handset and base station at any time.

When the monitored signal drops below the predetermined RSSI, the handset scans the system channels 46 to build a picture of the RSSI levels of respective channels. Once this has been accomplished, the handset selects the strongest signal to monitor 47 and determine the local base station transmitting this signal.

Another approach is to scan only when the RSSI of the actually used channel is going down. If there is no degradation of the RSSI, even if the level is lower then a predefined threshold level, it is sufficient to keep this channel if former channel scans have shown that no better channel is available.

A RSSI scan of all the channels of a system takes of the order of 10 ms. The handset then monitors the channel with the highest RSSI to determine which local base station is transmitting that signal 48. Once this information has been obtained, the handset is in a position to select a quiet channel 49 on that base station using the RSSI information collected.

If the triggering RSSI level is set to an acceptable level (eg. −63 dBm), a scan of channels will be prompted with enough time for a new traffic channel to be found without the user having to endure an unacceptable delay of order 50 ms) or the current channel deteriorating to an extent that the connection is dropped. When the handset is in idle lock, the time period for setting a traffic channel is of lesser concern to the user than during handover.

When handover is required there is already an existing traffic channel, so it is important to find a suitable replacement channel before the quality of that existing channel deteriorates to an extent that the call is dropped or an unacceptable amount of information is lost. It is always possible that there will not be a channel available on the current local base station 50 for an intercell handover. The RSSI level for triggering a system channel scan and search for a local base station, in this embodiment is, accordingly, set to allow respective attempts at identifying and selecting channels on two local base stations before signal quality, falls below a critical threshold.

The quality criteria for channel selection may be as follows:

1. The quietest available channel;
2. If this quietest channel cannot be attempted within the next three frames (i.e. it is within three carriers of the current primary scan of the base station) a channel that can be attempted within three frames can be selected if it is within 2 bands of the quietest, otherwise the quietest is selected.

Once a traffic channel is selected, the handset attempts to set up a call, receive a call or transfer an existing call to that channel depending on the circumstances for which a traffic channel 51 is being sought. If it is successful, the handset continues to use the allocated channel for two-way communication until the RSSI falls below the triggering level because that channel itself is deteriorating or the traffic channel is no longer required. If the channel does start to deteriorate 52, the scanning process is initiated 53 to identify and monitor the strongest signal 54 and identify the base station transmitting that signal 55. If there is a signal of suitable strength, this will probably be on a new base station. The results of the RSSI scan can then be used to select a quiet channel on an identified base station 56. If a selected channel on the base station is available 57, the channel is adopted 51, if not, the scanning process is repeated to locate another base station in the vicinity for further attempts.

The RSSI level of the signal transmitted by the base station, whether in idle or active lock continues to be monitored until the call is terminated or, perhaps the traffic channel is lost because there is no suitable channel available.

An optional feature of this invention is to switch off scanning altogether if the handset is determined to be in a residential environment. This is because in a residential environment 60 there is only one base station.

The DECT standard defines the ARI (Access Right Identifier) and the RPN (Radio Fixed Part Number. The RPN and the ARI together form the RFPI (Radio Fixed Part Identity. The RFPI is transmitted as bits a8 to a47 in the A-field using the NT-channel. (see ETS 300 175-3).

The Radio fixed part number RPN, which is allocated by the manufacturer/installer, is used to separate a maximum of 7 different cells from each other. In case of single cell base stations (FP) RPN is 0.

The ARI class A is intend to be used for small residential and private (PBX) single cell fixed parts and small multi-cell FP's with a maximum of seven RFPs.

Also the ARI classes C and D define systems where single cells (RPN=0) are possible. Only ARI class B is reserved for more complex private installations therefore it is unlikely that class B systems contain the RPN=0.

By looking at the last bit of the RFPI and the ARI class, the handset can determine whether the handset is listening to a residential base station. If the last bit of the RFPI is 0 and the ARI class is set to A, C or D, no other base station is connected to the base station transmitting the signal. Scanning for base stations can then be suspended 61 as there are no further base stations. If a traffic channel deteriorates, the handset scans to find a new quiet channel on the same base station.

In view of the foregoing description it will be evident to a person skilled in the art that various modifications may be made within the scope of the invention in particular the invention is applicable for use under other protocols including Wireless Customer Premises Equipment (WCPE) and Personal Handyphone System (PHS).

The present invention includes any novel feature or combination of features disclosed herein either explicitly, or implicitly or any generalisation thereof irrespective of whether or not it relates to the claimed invention or mitigates any or all of the problems addressed.

What is claimed is:

1. A radio telephone for communication in a radio system having a plurality of system channels for allowing communication on a selected system channel between the radio telephone and a base station which transmits signals on the selected system channel, the radio telephone comprising:

processing means operative, for monitoring a signal transmitted by a base station on one of the plurality of system channels to determine whether the signal has a parameter that meets a predetermined criterion, in response to the monitored signal meeting the predetermined criterion, and when a previous scanning operation has determined that no other system channel exists on which a base station is transmitting a signal, scanning respective system channels and selecting a different transmitted signal for monitoring, and in response to an indication that a system channel is required for a call, scanning the respective system channels for an available system channel on the base station transmitting the monitored signal.

2. A radio telephone according to claim 1, wherein the parameter is the strength of the monitored signal.

3. A radio telephone according to claim 2, wherein the strength of the signal is determined by its RSSI.

4. A radio telephone according to claim 3, wherein the predetermined criterion is the parameter falling beyond a predetermined unit.

5. A radio telephone according to claim 4, wherein the predetermined limit is set in absolute terms.

6. A radio telephone according to claim 5, wherein the radio telephone is operative to determine if it is operating in a first or second environment.

7. A radio telephone according to claim 4, wherein the predetermined limit is set relative to the initial value of the parameter.

8. A radio telephone according to claim 7, wherein the radio telephone is operative to determine if it is operating in a first or second environment.

9. A radio telephone according to claim 4, wherein the radio telephone is operative to determine if it is operating in a first or second environment.

10. A radio telephone according to claim 3, wherein the radio telephone is operative to determine if it is operating in a first or second environment.

11. A radio telephone according to claim 2, wherein the radio telephone is operative to determine if it is operating in a first or second environment.

12. A radio telephone according to claim 1, wherein the predetermined criterion is the parameter falling beyond a predetermined limit.

13. A radio telephone according to claim 12, wherein the predetermined limit is set in absolute terms.

14. A radio telephone according to claim 13, wherein the radio telephone is operative to determine if it is operating in a first or second environment.

15. A radio telephone according to claim 12, wherein the predetermined limit is set to the initial value of the parameter.

16. A radio telephone according to claim 15, wherein the radio telephone is operative to determine if it is operating in a first or second environment.

17. A radio telephone according to claim 12, wherein the radio telephone is operative to determine if it is operating in a first or second environment.

18. A radio telephone according to claim 1, wherein the radiotelephone is operative to determine if it is operating in a first or second environment.

19. A radio telephone according to claim 18, wherein if the radio telephone determines that it is operating in the first environment all scans to monitor channels for additional local base stations are suspended.

20. A radio telephone according to claim 19, wherein the radio telephone is operative to determine if it is operating in the first or second environment by monitoring messages transmitted by a selected base station.

21. A radio telephone according to claim 18, wherein the radio telephone is operative to determine if it is operating in the first or second environment by monitoring messages transmitted by a selected base station.

22. A radio telephone according to claim 2, wherein the predetermined criterion is the parameter falling beyond a predetermined unit.

23. A radio telephone according to claim 22, wherein the predetermined limit is set in absolute terms.

24. A radio telephone according to claim 23, wherein the radio telephone is operative to determine if it is operating in a first or second environment.

25. A radio telephone according to claim 22, wherein the predetermined limit is set relative to the initial value of the parameter.

26. A radio telephone according to claim 25, wherein the radio telephone is operative to determine if it is operating in a first or second environment.

27. A radio telephone according to claim 22, wherein the radio telephone is operative to determine if it is operating in a first or second environment.

28. A method of operating a radio telephone in a radio system having a plurality of system channels allowing communication on a selected system channel between the radio telephone and a base station which transmits signals on the selected system channel, said method comprising:

monitoring a signal transmitted by a base station on one of the plurality of system channels to determine whether the signal has a parameter that meets a predetermined criterion;

in response to the monitored signal meeting the predetermined criterion, and when a previous scanning operation has determined that no other system channel exists on which a base station is transmitting a signal, scanning respective system channels and selecting a different transmitted signal for monitoring; and in response to an indication that a system channel is required for a call, scanning the respective system channels for an available system channel on the base station transmitting the monitored signal.

29. A method according to claim 28, wherein scanning to identify a local base station is suspended if the system has only one base station.

* * * * *